(12) United States Patent
Hamilton, Jr.

(10) Patent No.: US 6,900,836 B2
(45) Date of Patent: *May 31, 2005

(54) CORRECTING DEFECTS IN A DIGITAL IMAGE CAUSED BY A PRE-EXISTING DEFECT IN A PIXEL OF AN IMAGE SENSOR

(75) Inventor: John F. Hamilton, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 501 days.

This patent is subject to a terminal disclaimer.

(21) Appl. No.: 09/788,798

(22) Filed: Feb. 19, 2001

(65) Prior Publication Data

US 2002/0158977 A1 Oct. 31, 2002

(51) Int. Cl.[7] .......................... H04N 5/217; H04N 9/64; G06K 9/40
(52) U.S. Cl. ..................... 348/241; 348/246; 382/275
(58) Field of Search .............................. 348/241–252; 345/611, 616; 375/240.27; 382/275, 254; 714/746, 747

(56) References Cited

U.S. PATENT DOCUMENTS

| | | | |
|---|---|---|---|
| 3,971,065 A | | 7/1976 | Bayer |
| 4,590,520 A | | 5/1986 | Frame et al. |
| 5,198,906 A | | 3/1993 | Yamashita |
| 5,436,659 A | | 7/1995 | Vincent |
| 5,805,216 A | * | 9/1998 | Tabei et al. .................. 348/246 |
| 6,226,034 B1 | * | 5/2001 | Katayama .................... 348/242 |
| 6,455,832 B1 | | 9/2002 | Kuwabara |
| 6,611,288 B1 | * | 8/2003 | Fossum et al. .............. 348/246 |
| 6,741,754 B2 | * | 5/2004 | Hamilton, Jr. .............. 382/275 |
| 2002/0080917 A1 | * | 6/2002 | Granfors et al. ........... 378/98.8 |
| 2002/0126209 A1 | * | 9/2002 | Yamada et al. ............. 348/219 |

OTHER PUBLICATIONS

Tang Kuo et al, "Fast Integrated Algorithm and Implementations for the Interpolation and Color Correction of CCD–Sensed Color Signals",Circuits and Systems, 1998, ISCAS '98, vol.: 4, May 31–Jun. 3, 1998 pp.: 225–228 vol. 4.*

Lee et al, "High Quality Image Interpolation for Color Filter Arrays", Systems, Man, and Cybernetics, 2000 IEEE International Conference on , vol.: 2 , Oct. 8–11, 2000 pp.: 1547 –1550 vol. 2.*

* cited by examiner

*Primary Examiner*—Wendy R. Garber
*Assistant Examiner*—Kelly L. Jerabek
(74) *Attorney, Agent, or Firm*—Raymond L. Owens

(57) ABSTRACT

A method for correcting for defects in a digital image taken by an image sensor when there is a pre-existing defect in at least one pixel of the image sensor which causes a line of pixels in the digital image to have corrupted data, includes the steps of capturing the digital image in the image sensor and reading out such digital image to provide the digital image with the line of pixels in the digital image having corrupted data; computing classifiers based on adjacent non-corrupted pixel data which indicate that there is a horizontal edge or a diagonal edge feature which passes through the defective column; and adaptively replacing the data in the corrupted image pixels by selecting an algorithm which correponds to the edge feature identified by the classifier and using the valid data in the neighboring non-corrupted pixels of the selected edge feature.

6 Claims, 3 Drawing Sheets

CORRECTING DEFECTS IN A DIGITAL IMAGE CAUSED BY A PRE-EXISTING DEFECT IN A PIXEL OF AN IMAGE SENSOR

CROSS REFERENCE TO RELATED APPLICATION

Reference is made to commonly-assigned U.S. patent application Ser. No. 09/788,787 filed Feb. 19, 2001, entitled "Correcting For Defects In A Digital Image Taken By An Image Sensor Caused By Pre-Existing Defects In Two Pixels In Adjacent Columns Of An Image Sensor" by John F. Hamilton, Jr., the disclosure of which is incorporated herein.

FIELD OF THE INVENTION

The present invention relates to correcting for corrupted data in a digital image caused by defective pixels in an image sensor.

BACKGROUND OF THE INVENTION

In certain types of image sensors, when there is a defect in a pixel of such sensor it causes a line of pixels in a digital image to have corrupt data. This happens during the transfer of electrons corresponding to pixels when such electrons are transferred through the defective pixel. An example of this situation is a full frame image sensor. In a typical full frame image sensor after an image is captured, electrons stored in the pixels of such sensor are transferred a line at a time through the pixels of the image sensor. A defective pixel will corrupt data stored in the electrons of subsequent pixels which pass throught it. This causes a line of corrupted pixel data. In a full frame image sensor, a column defect is an anomaly in the structure of an image sensor that prevents the vertical transfer of pixel charge packets. As a consequence, none of the affected pixels in the column can provide valid image information. If left untreated, this condition would produce a partial height or a full height vertical line artifact running through the image. The current method of concealing a column defect is to average nearest horizontal neighbors of the same filter type. In a standard color filter array (CFA), for example, the Bayer CFA pattern shown in commonly-assigned U.S. Pat. No. 3,971,065, that means averaging the pixel two positions to the left with the pixel two positions to the right. While this method works well enough for the vast majority of pixels, it fails to properly handle corrupted pixels in certain image contexts, such as high contrast diagonal edges. In addition, when the current method fails, it doesn't fail gracefully, but rather with opposing vertical spikes of spurious color.

SUMMARY OF THE INVENTION

It is an object of the present invention to provide an improved method for correcting for a line of corrupted data in a digital image formed by an image sensor with a defective pixel.

It is another object of the present invention to provide a method which is particularly suited for correcting for column defects in a full frame image sensor and that works effectively for a variety of scene content including high contrast diagonal edges.

These objects are achieved in a method for correcting for defects in a digital image taken by an image sensor when there is a pre-existing defect in at least one pixel of the image sensor which causes a line of pixels in the digital image to have corrupted data, comprising the steps of:

(a) providing a defect map which identifies the position of the defective pixel and specifies the line of pixels which during readout will be caused to have corrupted data;

(b) capturing the digital image in the image sensor and readout such digital image to provide the digital image with the line of pixels in the digital image having corrupted data;

(c) computing classifiers based on adjacent non-corrupted pixel data which indicate that there is a horizontal edge or a diagonal edge feature which passes through the defective column; and (d) adaptively replacing the data in the corrupted image pixels by selecting an algorithm which correponds to the edge feature identified by the classifier and using the valid data in the neighboring non-corrupted pixels of the selected edge feature.

It is an advantage of the present invention to provide a concealment algorithm for correcting for corruption in a line of pixel data caused by a defective pixel in an image sensor such as a full frame image sensor. This algorithm significantly improves the efficacy of correcting for a line of corrupted pixel data over a wide range of scene content.

DETAILED DESCRIPTION OF THE PREFERRED EMBODIMENT

Since single-sensor cameras employing color filter arrays are well known, the present description will be directed in particular to elements forming part of, or cooperating more directly with, apparatus and method in accordance with the present invention. Elements not specifically shown or described herein may be selected from those known in the art.

The present invention corrects for corrupted data in an output image caused by one or more defective pixels. Throughout the specification the terms "column" and "line" are used interchangeably. For example, a line of pixels of corrupted data could also be referred to as a column of corrupted data. Moreover, when reference is made to a column or line of corrupted data as will become clearer hereinafter, the entire column or line or a portion thereof or part of a line of column of an output data image may be corrupted. In such a case the corrupted portion will be referred to a column or line of data.

Figure 1:
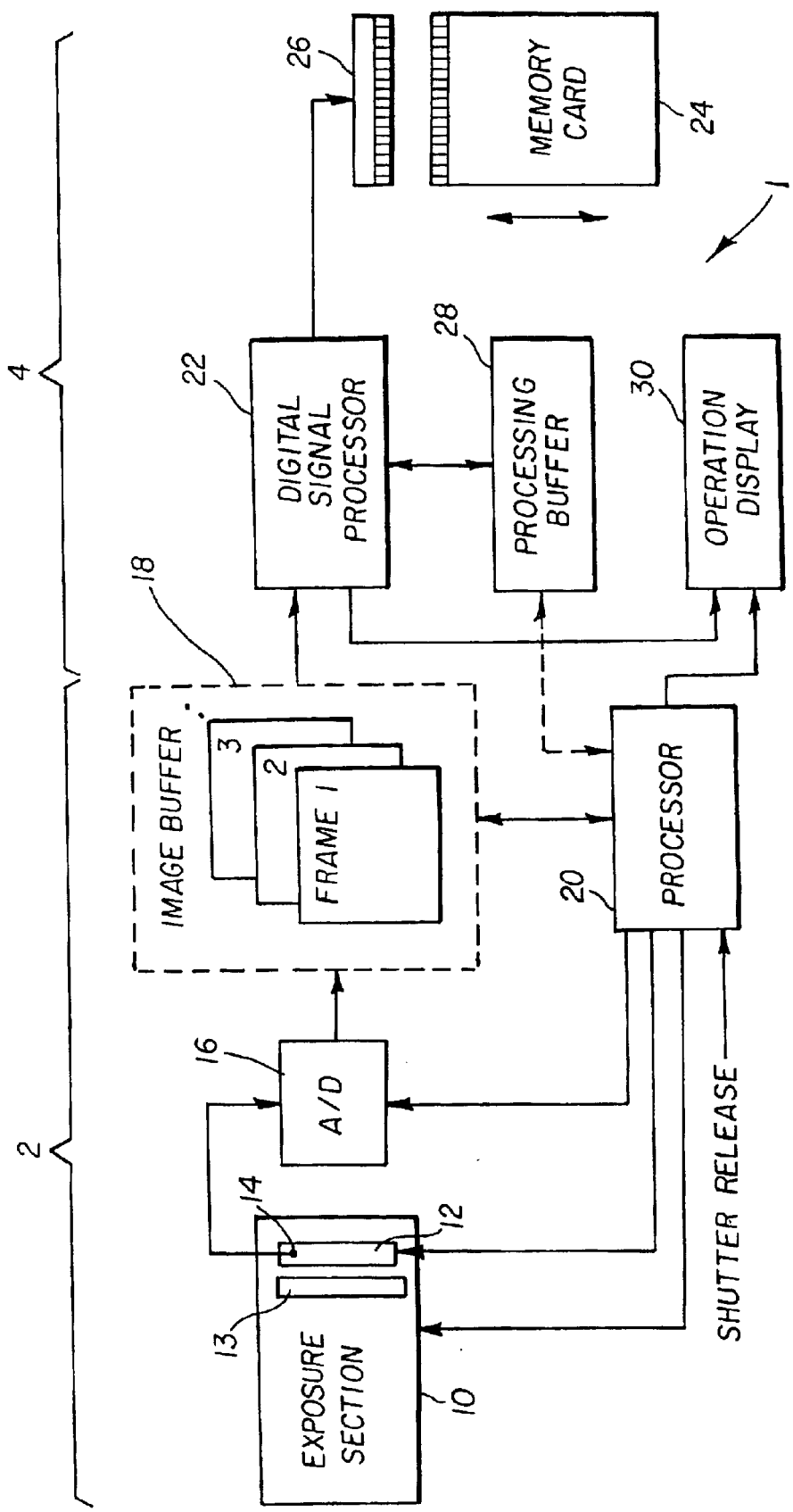
FIG. 1 is a block diagram of an electronic still camera employing the defect correction algorithm according to the present invention.

Referring initially to FIG. 1, an electronic still camera 1 is generally divided into an input section 2 and an interpolating and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperature, and a shutter, which regulates exposure time. The image sensor 12, which includes a two-dimensional array of photosites corresponding to picture elements (pixels) of the image, is a conventional charge-couple device (CCD) using well-known interline transfer or full frame transfer techniques. The image sensor 12 is covered by a color filter array (CFA) 13, known as a Bayer array (commonly-assigned U.S. Pat. No. 3,971,065), in which each pixel in the sensor is covered by a colored filter. In particular, chrominance colors (red and blue) are interspersed among a checkerboard pattern of luminance colors (green). The image sensor 12 is exposed to light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element. The digital signals are applied to an image buffer 18, which may be a random access memory (RAM) with storage capacity for a plurality of still images.

A control processor 20 generally controls the input section 2 of the camera by initiating and controlling exposure (by opening the diaphragm and shutter (not shown) in the exposure section 10), by generating the horizontal and vertical clocks needed for driving the image sensor 12 and for clocking image information therefrom, and by enabling the A/D converter 16 in conjunction with the image buffer 18 for each signal segment relating to the picture element. (The control processor 20 would ordinarily include a microprocessor coupled with a system timing circuit.) Once a certain number of digital image signals have been accumulated in the image buffer 18, the stored signals are applied to a digital signal processor 22, which controls the throughput processing rate for the interpolation and recording section 4 of the camera. The digital signal processor 22 applies an interpolation algorithm to the digital image signals, and sends the interpolation signals to a conventional, removable memory card 24 via a connector 26.

Since the interpolation and related processing ordinarily occurs over several steps, the intermediate products of the processing algorithm are stored in a processing buffer 28. (The processing buffer 28 may also be configured as a part of the memory space of the image buffer 18.) The number of image signals needed in the image buffer 18 before digital processing can begin depends on the type of processing, that is, for a neighborhood interpolation to begin, a block of signals including at least a portion of the image signals including a video frame must be available. Consequently, in most circumstances, the intepolation may commence as soon as the requisite block of picture elements is present in buffer 18.

The input section 2 operates at a rate commensurate with normal operation of the camera while interpolation, which may consume more time, can be relatively divorced from the input rate. The exposure section 10 exposes the image sensor 12 to image light for a period of time dependent upon exposure requirements, for example, a time period between $\frac{1}{1000}$ and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput of the interpolation and recording section 4 is determined by the speed of the digital signal processor 22.

One desirable consequence of this achitecture is that the processing algorithm employed in the interpolation and recording section may be selected for quality treatment of images rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the buffer 18 shown in FIG. 1 provides for storage of a plurality of images, in effect permiting a series of images tp "stack up" at video rates. The size of the buffer is established to hold enough consecutive images to cover most picture-taking situations.

An operational display panel 30 is connected to the control processor 20 for displaying information useful in the operation of the camera. Such information might include typical photographic data, such as shutter speed, aperture, exposure bias, color balance (auto, tungsten, fluorescent, daylight), field-frame, low battery, low light, exposure mode (aperture preferred, shutter preferred), and so on. Moreover, other information unique to this type of camera is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

Referring to FIG. 1, the present invention can be applied to any digital camera sensor (block 12) producing partial columns or entire columns of corrupted image data. In addition to a single column corruption, the present invention also addresses the problem of double column corruption, in which two adjacent sensor columns produce corrupted data. The algorithm for replacing the corrupted image data can be implimented in the digital signal processing block 22, although other arrangements are possible. The present invention addresses column defects for a Bayer pattern RGB sensor, although it is understood that the method can be applied to other filter combinations.

Figure 2:
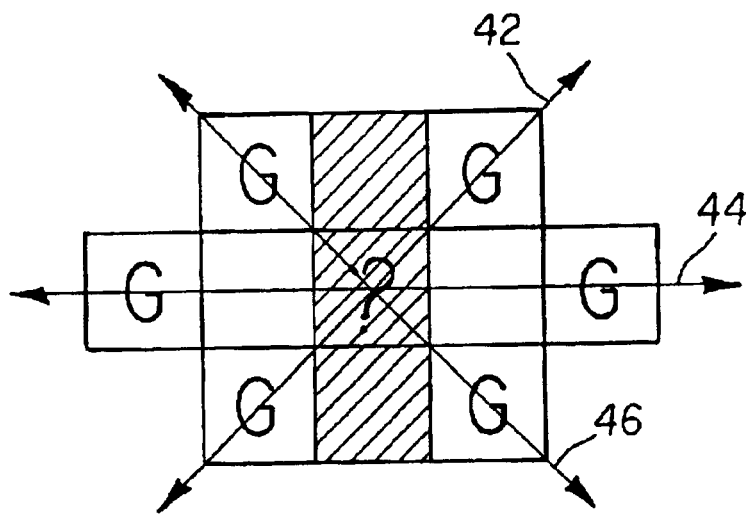
FIG. 2 is a diagram of green pixels around a corrupted green pixel in a corrupted column.
Figure 3:
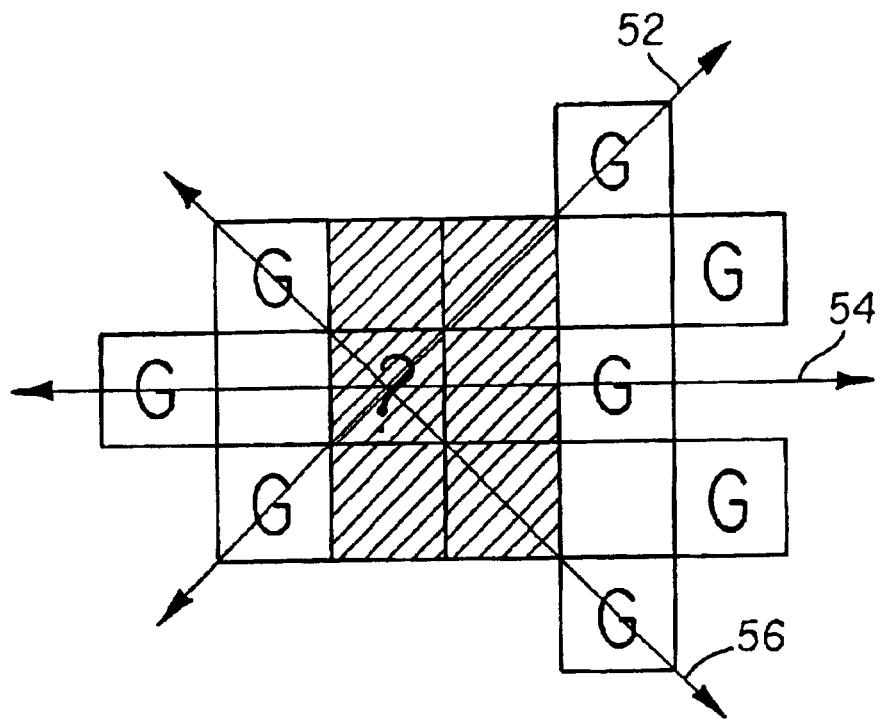
FIG. 3 is a diagram of green pixels around a corrupted green pixel in one of two adjacent corrupted columns.

Referring to FIG. 2, when an entire column of data is corrupted, there are only three convenient directions for interpolation: slash (+1 slope) (line 42), horizontal (line 44), and backslash (−1 slope) (line 46). For green pixel repair in a single corrupted column, FIG. 2 shows the directions and the known surrounding green values. In the case of a double column corruption, the situation is similar but the problem is more difficult because valid data is now further away. In FIG. 3 are shown the three directions used for green pixel repair when two adjacent columns of data are corrupted. Correspondingly, the three directions are: slash (line 52), horizontal (line 54), and backslash (line 56).

Figure 4:
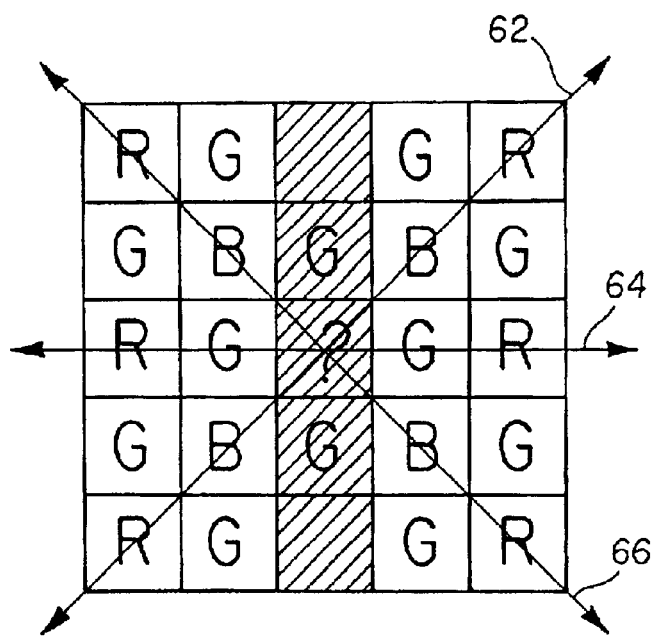
FIG. 4 is a diagram of red, green, and blue pixels around a corrupted red pixel in a corrupted column.
Figure 5:
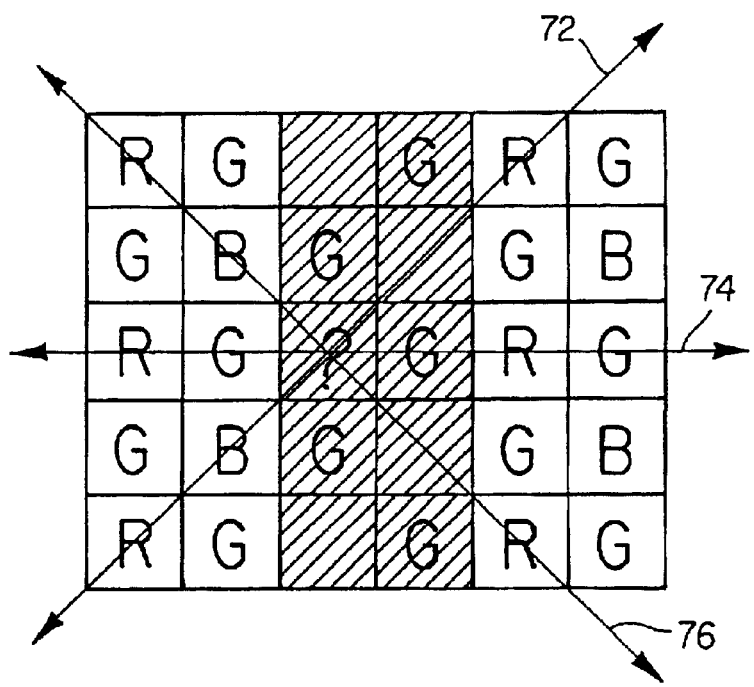
FIG. 5 is a diagram of red, green, and blue pixels around a corrupted red pixel in one of two adjacent corrupted columns.

Once the corrupted green values have been replaced, attention turns to the corrupted red or blue values. These values are found by interpolating the color differences (R−G) and (B−G). For a single corrupted column, FIG. 4 shows the three directions used for red, as an example. Correspondingly, the three directions are: slash (line 62), horizontal (line 64), and backslash (line 66). Because of the spacing of the red and blue pixels, FIG. 5 (depicting a double column corruption) shows that color difference interpolation may be handled the same way as shown in FIG. 4. Correspondingly, the three directions are: slash (line 72), horizontal (line 74), and backslash (line 76). Green values are shown in the shaded columns because the replaced green values are known at the time of color difference interpolation.

Following the pattern of FIG. 2, the diagram below shows the known green values in the case of a single column corruption. The corrupted column is column 5 and the question marks "???" at position 55 (i.e. col 5, row 5) locate the corrupted green value, G55, to be replaced. To illustrate a specific case, column 5 is assumed to be a green/blue column, so columns 4 and 6 are green/red columns.

| col | 3 | 4 | 5 | 6 | 7 | row |
|-----|-----|-----|-----|-----|-----|-----|
|     | G33 | R43 |     | R63 | G73 | 3   |
|     |     | G44 |     | G64 |     | 4   |
|     | G35 | R45 | ??? | R65 | G75 | 5   |
|     |     | G46 |     | G66 |     | 6   |
|     | G37 | R47 |     | R67 | G77 | 7   |

First, two temporary green values, g45 and g65, are computed as follows:

$$g45=(-R43+3*G44+2*R45+3*G46-R47+3)/6$$

$$g65=(-R63+3*G64+2*R65+3*G66-R67+3)/6$$

The values g45 and g65 are temporary and are NOT the values G45 and G65 which appear later. Next, define some classifer values to assist in determining which is the preferred interpolation direction for replacing the corrupted green value. The directions are denoted as slash, horz, and back ("horz" for horizontal and "back" for backslash). Using "Abs" to denote the absolute value function, the classifiers as defined as follows:

$$Clas(Slash)=Abs(G35-G44)+Abs(G46-G64)+Abs(G66-G75)+Abs(G37-G46)+Abs(G64-G73)$$

$$Clas(Horz)=Abs(G44-G64)+Abs(g45-g65)+Abs(G46-G66)+Abs(G35-g45)+Abs\ g65-G75)$$

$$Clas(Back)=Abs(G35-G46)+Abs(G44-G66)+Abs(G64-G75)+Abs(G33-G44)+Abs(G66-G77)$$

and the auxiliary value:

$$Aux(Horz)=Abs(G44-G46)+Abs(2*R45-R43-R47)+Abs(G64-G66)+Abs(2*R65-R63-R67)$$

Accordingly, the following predictor values are defined:

$$Pred(Slash)=(4*(G46+G64)-(G37+G73)+3)/6$$

$$Pred(Horz\_Hard)=(G35+G75)/2$$

$$Pred(Horz\_Soft)=(4*(g45+g65)-(G35+G75)+3)/6$$

$$Pred(Back)=(4*(G44+G66)-(G33+G77)+3)/6$$

$$Pred(Vert)=(g45+g65)/2$$

As will become clear hereinafter, computed classifiers based on adjacent non-corrupted pixel data identify those cases in which there is a horizontal edge or a diagonal edge feature which passes through the defective column. Thereafter, the process adaptively replaces the data in the corrupted image pixels by selecting an algorithm which correponds to the edge feature identified by the classifier and using the valid data in the neighboring non-corrupted pixels of the selected edge feature.

The logic for utilizing the classifier values and selecting the proper predictor value, for example where corrupted green pixel G55 needs to be replaced.

```
IF Clas(Horz) < Min( Clas(Slash), Clas(Back)) THEN
    IF Threshold_1 < Aux(Horz) THEN
        IF Threshold_2 < Aux(Horz) THEN
            set G55 = Pred(Horz_Hard)
        ELSE
            set G55 = Pred(Horz_Soft)
        ENDIF
    ELSE
        set G55 = Pred(Vert)
    ENDIF
ELSE
    IF Clas(Slash) < Clas(Back) THEN
        set G55 = Pred(Slash)
    ELSE
        set G55 = Pred(Back)
    ENDIF
ENDIF
```

Typical values for Threshold_1 and Threshold_1 for an 8-bit image are 80 and 100 respectively.

Using the above algorithm the corrupted value for pixel G55 is now replaced. In a similar manner, the remaining corrupted green pixels are also replaced. Having replaced the corrupted green values, the corrupted red and blue values are now considered. To illustrate a specific case, the following account is done for replacing a corrupted red value. The very same action would be taken for blue. The diagram below follows the pattern shown in FIG. 4. As before, the pixel of interest is located in the 55 position, containing the question marks "???". Because the corrupted green replacement has already been done, there are now valid green value defined above and below this position.

| col | 3   | 4   | 5   | 6   | 7   | row |
|-----|-----|-----|-----|-----|-----|-----|
|     | R33 | G43 |     | G63 | R73 | 3   |
|     | G34 | B44 | G54 | B64 | G74 | 4   |
|     | R35 | G45 | ??? | G65 | R75 | 5   |
|     | G36 | B46 | G56 | B66 | G76 | 6   |
|     | R37 | G47 |     | G67 | R77 | 7   |

The process starts by summing the four central green values:

$$Green(Ctr)=G54+G45+G56+G65$$

Next, three more green values are computed as follows:

$$Green\ (Slash)=(Green\ (Ctr)-(G36+G47+G74+G63))/2$$

$$Green\ (Horz)=(Green(Ctr)-(G34+G36+G76+G74))/2$$

$$Green\ (Back)=(Green\ (Ctr)-(G43+G34+G67+G76))/2$$

These three green values are used in two ways. Their absolute values are used as classifiers, and they are also used as corrector terms in the corresponding predictor equations which follow:

$$Pred(Slash)=(R37+R73+Green\ (Slash))/2$$

$$Pred(Horz)=(R35+R75+Green\ (Horz))/2$$

$$Pred(Back)=(R33+R77+Green\ (Back))/2$$

The logic for finding the restored red value (R55) is as follows:

```
IF Abs(Green(Horz)) < Min( Abs( Green(Slash) ),
        Abs( Green(Back))) THEN
    set R55 = Pred(Horz)
ELSE
    IF Abs( Green(Slash)) < Abs( Green(Back)) THEN
        set R55 = Pred(Slash)
    ELSE
        set R55 = Pred(Back)
    ENDIF
ENDIF
```

This completes the description of the algorithm for a single corrupted column. Now the algorithm for handling a double column corruption will be discussed. These two algorithms (for single and double column defects) may be applied as many times as there are single and double column corruptions in an image, and they may be applied in any order. The only requirement is that two valid columns must appear on each side of the corrupted column or columns. For example, these correspond to columns 3, 4, 6, and 7 in the pixel neighborhood shown above.

Following the pattern of FIG. 3, the diagram below shows the valid green values in the case of a double column corruption. The corrupted columns are columns 5 and 6 and the question marks "???" at position 55 locate the corrupted green value to be restored. As before, replacing the corrupted green values is the first order of business.

| col | 3 | 4 | 5 | 6 | 7 | 8 | row |
|---|---|---|---|---|---|---|---|
|  |  |  |  |  | G73 |  | 3 |
|  |  | G44 |  | — |  | G84 | 4 |
|  | G35 |  | ??? |  | G75 |  | 5 |
|  |  | G46 |  | — |  | G86 | 6 |
|  |  |  |  |  | G77 |  | 7 |

Although the pixel of interest has been chosen from the left hand corrupted column, the reasoning and the equations that follow may be applied to the right hand column as well. One would simply draw the mirror image of the above diagram so that columns 4 and 5 become the corrupted ones.

First the following classifier values are computed:

$Clas(Slash)=Abs(G35-G44)+Abs(G46-G73)+Abs(G77-G86)$ $Clas(Horz)=Abs(G44-G84)+Abs(G35-G75)+Abs(G46-G86)$ $Clas(Back)=Abs(G35-G46)+Abs(G44-G77)+Abs(G73-G84)$ and the auxiliary value is computed:

$Aux(Horz)=Abs(G44+G84-G46-G86)$

Next, the following predictor values are computed:

$Pred(Slash)=(2*G46+G73+1)/3$ $Pred(Horz)=(G35+G75)/2$ $Pred(Back)=(2*G44+G77+1)/3$ $Pred(Vert)=(Pred(Slash)+Pred(Back))/2$ The logic for utilizing the classifier values and selecting the proper predictor value is similar to the logic used in the previous case of a single corrupted column.

```
IF Clas(Horz) < Min( Clas(Slash), Clas(Back)) THEN
    IF Threshold_3 < Aux(Horz) THEN
        set G55 = Pred(Horz)
    ELSE
        set G55 = Pred(Vert)
    ENDIF
ELSE
    IF Clas(Slash) < Clas(Back) THEN
        set G55 = Pred(Slash)
    ELSE
        set G55 = Pred(Back)
ENDIF
```

In this case, a typical value for Threshold_3 for an 8-bit image is 24.

Having replaced corrupted green values, the corrupted red and blue values are now considered. As before, to illustrate a specific case, the following account is done for replacing a corrupted red value. The very same action would be taken for blue. The diagram below follows the pattern shown in FIG. 5. As before, the pixel of interest is located in the 55 position, containing the question marks "???". In addition, all the surrounding green values are known to be valid. This diagram for the double column case is nearly identical to the corresponding diagram for the single column case. The only difference is that the blue values of column 6 are corrupted because columns 5 and 6 are the two corrupted columns in this scenario and the blue values haven't been replaced yet. However, the blue values played no part in the single column algorithm's replacement of the corrupted red pixels. Consequently, the single column algorithm for red replacement can be used in the double column case with no modification.

| col | 3 | 4 | 5 | 6 | 7 | row |
|---|---|---|---|---|---|---|
|  | R33 | G43 |  | G63 | R73 | 3 |
|  | G34 | B44 | G54 |  | G74 | 4 |
|  | R35 | G45 | ??? | G65 | R75 | 5 |
|  | G36 | B46 | G56 |  | G76 | 6 |
|  | R37 | G47 |  | G67 | R77 | 7 |

Since the replacement of corrupted red and blue pixels is the final step in column defect concealment, the description of the double column algorithm is now complete.

The invention has been described in detail with particular reference to certain preferred embodiments thereof, but it will be understood that variations and modifications can be effected within the spirit and scope of the invention.

| PARTS LIST | |
|---|---|
| 2 | input section |
| 4 | interpolating and recording section |
| 10 | exposure section |
| 12 | image sensor |
| 13 | color filter array |
| 14 | output diode |
| 16 | A/D converter |
| 18 | image buffer |
| 20 | control processor |
| 22 | digital signal processor |
| 24 | removable memory card |
| 26 | connector |
| 28 | processing buffer |
| 30 | operational panel |

What is claimed is:

1. A method for correcting for defects in a digital image taken by an image sensor when there is a pre-existing line of defective pixels in the digital image which have corrupted data, comprising the steps of:
   (a) providing a defect map which identifies the position of the defective pixels in the line and specifies the line of pixels which during readout will be caused to have corrupted data;
   (b) capturing the digital image in the image sensor and reading out such digital image to provide the digital image with the line of pixels in the digital image having corrupted data;
   (c) computing classifiers based on adjacent non-corrupted pixel data not in the defective line of pixels which indicate that there is a horizontal or vertical edge or a diagonal edge feature which passes through the defective line of pixels, wherein none of the pixels in the defective line of pixels are used to compute the classifiers; and
   (d) adaptively replacing the data in the corrupted image pixels by selecting an algorithm which corresponds to the edge feature identified by the classifier and using the valid data in the neighboring non-corrupted pixels of the selected edge feature.

2. A method for correcting for defects in a digital image taken by a full frame CCD when there is a pre-existing defect in a line of defective pixels in the full frame CCD which have corrupted data, comprising the steps of:
   (a) providing a defect map which identifies the position of the defective pixels in the line in the full frame CCD and specifies the line of pixels which during readout will be caused to have corrupted data;
   (b) capturing the digital image in the full frame CCD and reading out such digital image to provide the digital image with the line of pixels having corrupted data;
   (c) computing classifiers based on adjacent non-corrupted pixel data not in the defective line of pixels which indicate that there is a horizontal or vertical edge or a diagonal edge feature which passes through the defective line of pixels, wherein none of the pixels in the defective line of pixels are used to compute the classifiers; and
   (d) adaptively replacing the data in the corrupted image pixels by selecting an algorithm which corresponds to the edge feature identified by the classifier and using the valid data in the neighboring non-corrupted pixels of the selected edge feature.

3. A method for correcting for defects in a digital image taken by a full frame color CCD having a plurality of different colored pixels wherein there is a pre-existing line of defective pixels in the full frame color CCD which have corrupted data, comprising the steps of:
   (a) providing a defect map which identifies the position of the defective pixels in the line in the full frame color CCD and specifies the line of pixels which during readout will be caused to have corrupted data;
   (b) capturing the digital image in the full frame color CCD and reading out such digital image to provide the colored digital image with the line of pixels having corrupted data;
   (c) computing classifiers based on adjacent non-corrupted pixel data not in the defective line of pixels which indicate that there is a horizontal or vertical edge or a diagonal edge feature which passes through the defective line of pixels, wherein none of the pixels in the defective line of pixels are used to compute the classifiers; and
   (d) adaptively replacing the data in the corrupted image pixels by selecting an algorithm which corresponds to the edge feature identified by the classifier and using the valid data in the neighboring non-corrupted pixels of the selected edge feature.

4. The method of claim 3 wherein the full frame color CCD is provided in a single sensor digital camera which produces single color values for each color pixel in the digital image and includes the step of:
   (e) interpolating color pixels in the digital image to provide for a plurality of color values for each color pixel in the digital image and wherein step (d) is provided before or after the interpolation step.

5. The method of claim 3 wherein the replacing step includes providing a plurality of classifiers based upon neighboring non-corrupted color pixels and selecting at least one of the classifiers to identify an appropriate formula for operating on neighboring non-corrupted color pixels to replace the values of the corrupted color pixels in the captured image.

6. The method of claim 3 wherein the corrupted color pixels in the digital image are aligned in a column of the digital image.

* * * * *